United States Patent [19]

Kamerman et al.

[11] Patent Number: 5,636,247

[45] Date of Patent: Jun. 3, 1997

[54] INFORMATION TRANSMISSION SYSTEM

[75] Inventors: Adriaan Kamerman, Nieuwegein; Anjur S. Krishnakumar, Bussum, both of Netherlands

[73] Assignee: Lucent Technologies Inc., Murray Hill, N.J.

[21] Appl. No.: 407,829

[22] Filed: Mar. 21, 1995

[30] Foreign Application Priority Data

Sep. 14, 1994 [GB] United Kingdom .................. 9418514

[51] Int. Cl.$^6$ ....................................................... H04K 1/10
[52] U.S. Cl. ........................... 375/260; 375/279; 375/308; 370/203; 370/483; 348/388
[58] Field of Search ............................. 375/260, 271, 375/279, 281, 283, 295, 302, 308, 377; 370/19, 20, 21, 23, 57, 69.1, 122, 71; 348/388, 397, 398

[56] References Cited

U.S. PATENT DOCUMENTS

| | | | |
|---|---|---|---|
| 5,201,071 | 4/1993 | Webb | 455/101 |
| 5,345,440 | 9/1994 | Gledhill et al. | 370/19 |
| 5,406,551 | 4/1995 | Saito et al. | 370/19 |

OTHER PUBLICATIONS

"Analysis and Simulation of a Digital Mobile Channel Using Orthogonal Frequency Division Multiplexing", by Leonard J. Cimini, Jr., IEEE Transactions on Communications, pp. 665–675, vol. COM–33, No. 7, Jul. 1985.

"An Example of a Multi–Resolution Digital Terrestrial TV Modem", by Paul G. M. deBot, et al., pp. 1785–1790, 1993 IEEE.

"The Effect of Modulation on the Power Rating of Multi-–Channel Linear Amplifiers", by D. W. Bennett, et al., pp. 322–333, University of Bristol, Lecture Notes in Computer Science 783.

*Primary Examiner*—Stephen Chin
*Assistant Examiner*—Amanda T. Le
*Attorney, Agent, or Firm*—Christopher N. Malvone

[57] ABSTRACT

A system for transmitting information over an OFDM channel using phase shift keying encoding employs a bit mapping encoder to reduce the crest factor (ratio of peak voltage to RMS voltage). For a 16 subchannel OFDM system using QPSK encoding, a first set of four symmetrically positioned pairs of subchannels is used to encode two bits of information on each subchannel. A second set of four symmetrically positioned pairs of subchannels is used to encode only one bit of information on each subchannel, with the resultant phasor for each pair of the second set of pairs of subchannels being orthogonal to the resultant phasor for one of the pairs of the first set of subchannels. With this arrangement, the crest factor is reduced.

11 Claims, 8 Drawing Sheets

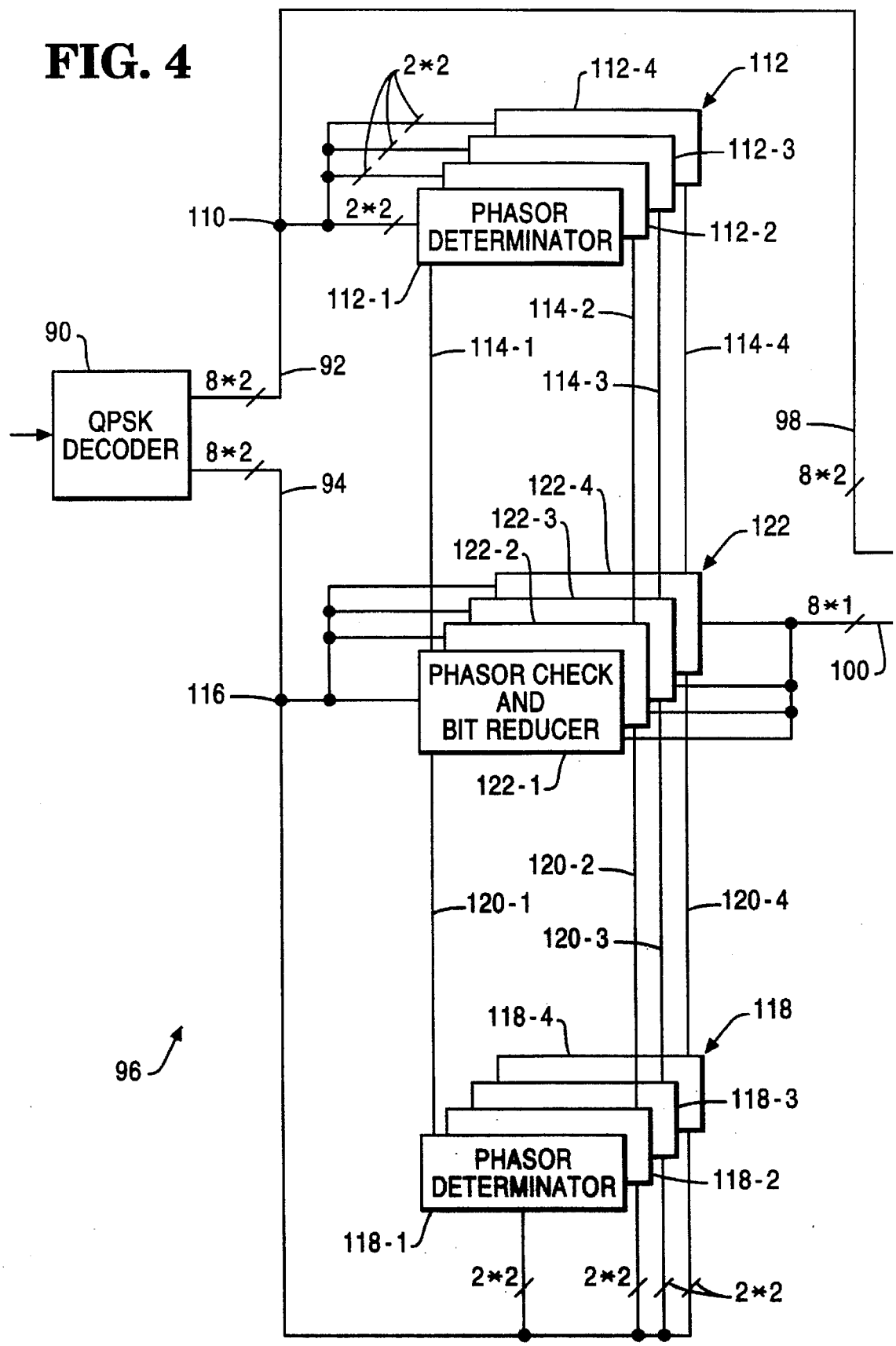

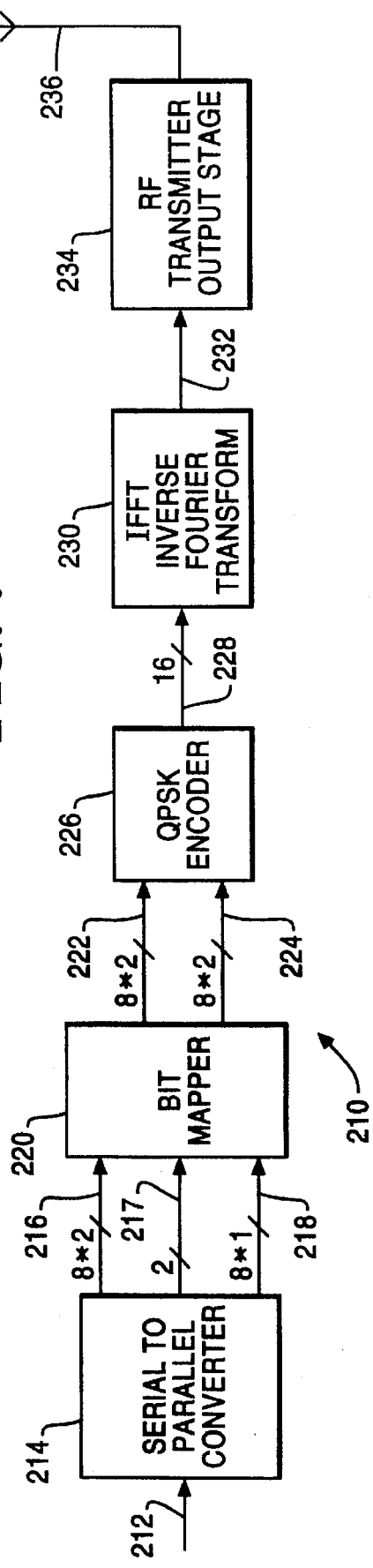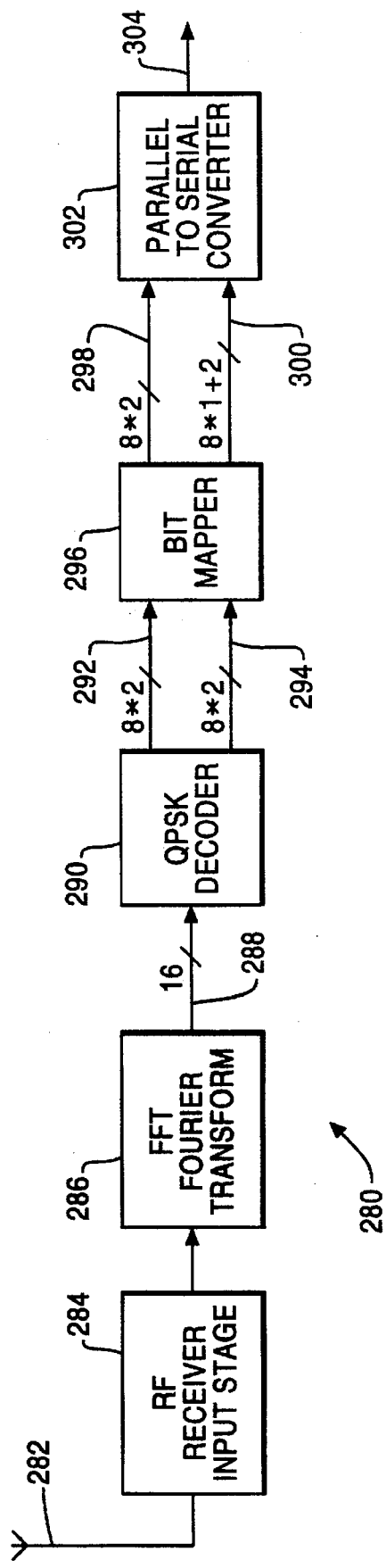

FIG. 8

| ORIGINAL PHASOR COMBINATION | MAPPED PHASOR COMBINATION | PERMUTATIONS FOR CONDITIONED SUBCHANNELS |
|---|---|---|
| AAAA | ABCD | ABCD<br>BCDA<br>CDAB<br>DABC |
| BBBB | BCDA | ABCD<br>BCDA<br>CDAB<br>DABC |
| CCCC | CDAB | ABCD<br>BCDA<br>CDAB<br>DABC |
| DDDD | DABC | ABCD<br>BCDA<br>CDAB<br>DABC |
| ABCD | ABCD | DCBA<br>CBAD<br>BADC<br>ADCB |
| BCDA | BCDA | DCBA<br>CBAD<br>BADC<br>ADCB |
| CDAB | CDAB | DCBA<br>CBAD<br>BADC<br>ADCB |
| DABC | DABC | DCBA<br>CBAD<br>BADC<br>ADCB |

INFORMATION TRANSMISSION SYSTEM

BACKGROUND OF THE INVENTION

This invention relates to the transmission of information. The invention has a particular application to the field of high speed digital wireless communications.

Various techniques are known for transmitting information using frequency modulation. The technique known as OFDM (orthogonal frequency division multiplexing) has certain advantages, particularly for wireless communications wherein impairments resulting from multipath propagation, such as in indoor environments, are experienced. An OFDM system is described, for example, in IEEE Transactions on Communications, Vol. COM-33, No. 7, July 1985, pages 665–675, L. J. Cimini: "Analysis and Simulation of a Digital Mobile Channel Using Orthogonal Frequency Division Multiplexing". In an OFDM system signals are transmitted simultaneously over a plurality of subchannels.

An OFDM system makes efficient use of bandwidth since the spectra of the individual subchannels are permitted to overlap, with the spectra of the individual subchannels being zero at the other subcarrier frequencies. Also, the subcarrier frequencies are separated by multiples of the inverse of the signalling interval so that coherent detection of a signal element in any one subchannel gives no output for a received element in any other subchannel. One advantage of an OFDM system is that modulation and demodulation can be effected using discrete Fourier transform procedures, enabling a fast Fourier transform to be utilized. It will be appreciated that an OFDM system is based on the modulation of individual subcarriers and summation of these modulated subcarriers. This enables a high data rate to be achieved, while the modulation rate per subcarrier is lower and allows more delay spread without the use of accurate equalisation.

In one form of OFDM system, signals are encoded for transmission over the OFDM subchannels. Typically, such coding involves a phase-significant component. An example is PSK (phase shift keying) coding.

When information is transmitted over radio frequencies, an RF (radio frequency) power stage is utilized. An important parameter in connection with transmission at such frequencies is the crest factor. By the crest factor of a signal is meant the ratio of peak voltage to the RMS (root mean square) voltage. For an RF system this corresponds to the ratio of peak envelope voltage to mean (RMS) voltage.

For an OFDM system using PSK, the crest factor is high since there exists the possibility that the individual amplitudes of the OFDM subchannels can all make a positive contribution if they all have the same phase. In this connection, it will be appreciated that the average power of the combined subchannels is calculated using power summation because of the independence of the individual subchannel signals.

A high crest factor has the disadvantage that the output RF power stage has high design requirements in order to ensure correct operation having regard to signal compression, clipping and other degradation. A further disadvantage is that a high crest factor may more readily lead to peak output power levels which exceed officially prescribed limits, e.g., for the United States, levels specified in FCC (Federal Communications Commission) regulations.

SUMMARY OF THE INVENTION

It is an object of the present invention to provide a method of transmitting information in an OFDM system, wherein the above disadvantages are alleviated.

According to one aspect of the present invention, there is provided a method of transmitting information over an OFDM channel including a plurality of OFDM subchannels, characterized by the steps of: determining a phasor axis for each pair of a first set of pairs of symmetrically positioned subchannels of said OFDM subchannels, the determination being dependent on the information to be transmitted over that subchannel pair; determining a phasor axis for each pair of a second set of pairs of symmetrically positioned subchannels of said OFDM subchannels, the determined phasor axis being dependent on information to be transmitted and being orthogonal to the phasor axis of one of said first set of pairs of subchannels; and transmitting signals dependent on the determined phasor axes over said OFDM subchannels.

According to another aspect of the present invention there is provided an apparatus for transmitting information over an OFDM channel including a plurality of OFDM subchannels, characterized by bit mapping means adapted to determine a phasor axis for each of a first set of symmetrically positioned subchannels of said OFDM subchannels in dependence on the information to be transmitted over that subchannel pair and to determine a phasor axis for each pair of a second set of pairs of symmetrically positioned subchannels of said OFDM subchannels in dependence on information to be transmitted, and such as to be orthogonal to the phasor axis of one of said first pairs of subchannels, and transmitting means adapted to transmit signals having the determined phasor axes over said OFDM subchannels.

BRIEF DESCRIPTION OF THE DRAWINGS

FIG. 4 is a block diagram of a bit mapper utilized in the receiver unit shown in FIG. 3;

FIG. 7 is a block diagram of a transmitter unit according to a second embodiment of the invention;

FIG. 8 is a table illustrating phasor combinations helpful in understanding the operation of the second embodiment of the invention;

FIG. 10 is a block diagram of a receiver unit according to the second embodiment of the invention.

DETAILED DESCRIPTION OF THE PREFERRED EMBODIMENT

Figure 1:
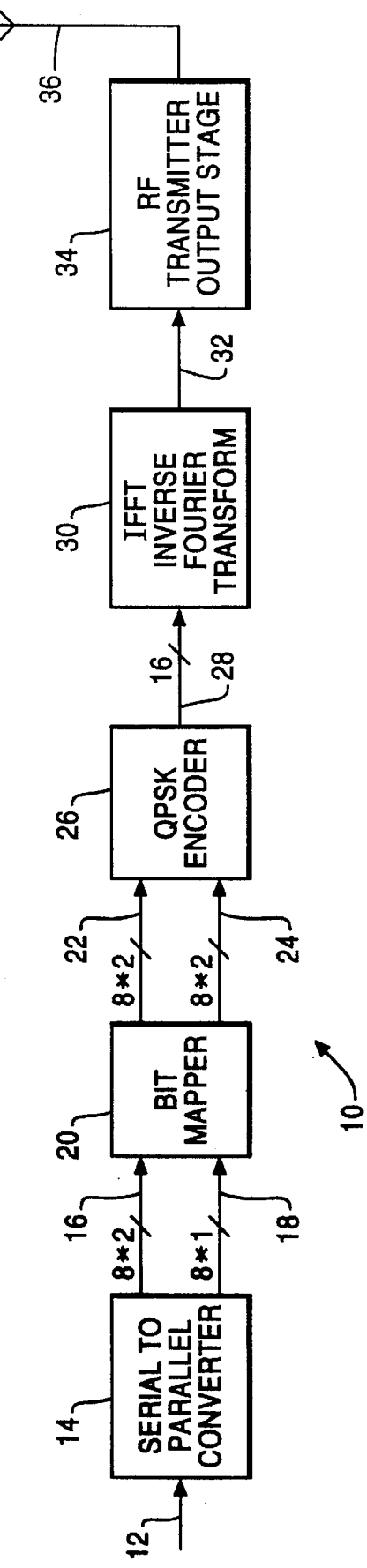
FIG. 1 is a block diagram of a transmitter unit according to a first embodiment of the invention.

While the invention is susceptible to various modifications and alternative forms, specific embodiments thereof have been shown by way of example in the drawings and will herein be described in detail. It should be understood, however, that there is no intent to limit the invention to the particular forms disclosed, but on the contrary, the intention is to cover all modifications, equivalents, and alternatives falling within the spirit and scope of the invention as defined by the appended claims.

Referring first to FIG. 1, there is shown a simplified block diagram of a first embodiment of a transmitter unit 10 of a 24 Mbps data transmission system adapted to transmit data over a 16-subchannel OFDM/QPSK channel, that is, a 16 subchannel OFDM system using quadrature phase shift keying for encoding. It will be appreciated that QPSK encoding has a phasor (phase vector) component which has one of four values, 0°, 90°, 180° or 270°, in accordance with a bit pair value, sometimes referred to as a dibit. Incoming data to be transmitted is applied in serial form on a line 12 to a serial-to-parallel converter 14. The 24 output lines of the serial-to-parallel converter 14 are arranged as eight paired lines 16 and eight single lines 18, the lines 16 to 18 being coupled to a bit mapper 20, the operation of which will be described hereinbelow.

The output of the bit mapper 20 is arranged as eight paired lines 22 and eight paired lines 24, all 16 paired lines being applied to a QPSK encoder block, consisting of 16 individual QPSK encoders (not shown) coupled over 16 lines 28 to an inverse Fourier transform circuit 30, which provides an output over a line 32 to an RF transmitter output stage 34 which feeds an antenna 36. The inverse FFT circuit 30 operates in known manner with sampling at once per 62.5 nanoseconds, corresponding to a symbol time interval of 1000 nanoseconds (1 microsecond). The RF transmitter output stage 34 includes conventional means for upconversion from baseband to RF, filtering and amplification.

Figure 2:
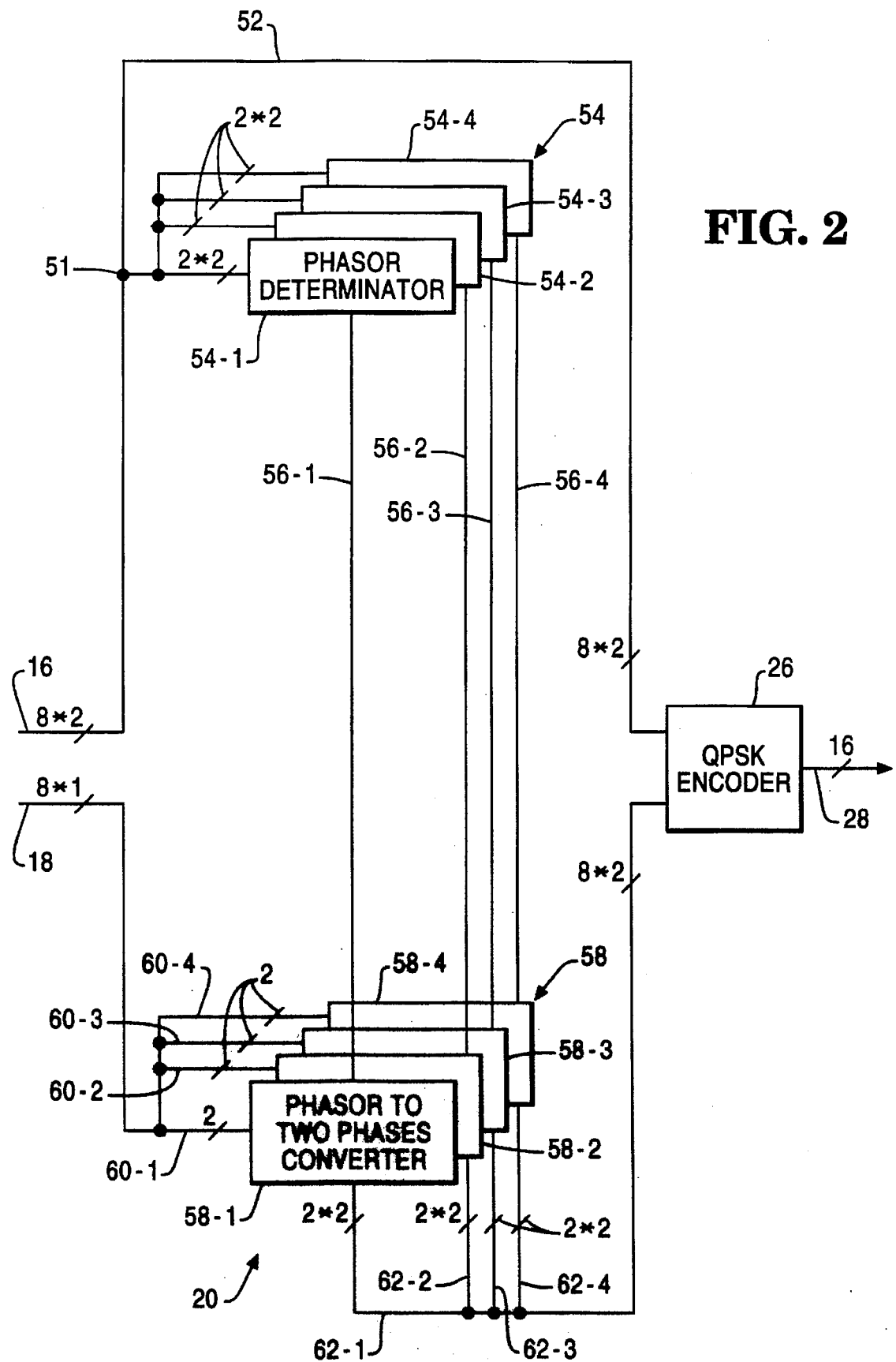
FIG. 2 is a block diagram of a bit mapper utilized in the transmitter unit shown in FIG. 1.

Referring now to FIG. 2, there is shown a block diagram of the bit mapper 20. The eight paired lines 16 are connected directly via node 51, as eight paired lines 52 to the QPSK encoder 26. The eight paired lines 16 are also connected to respective phasor determinator circuits 54, shown individually as phasor determinator circuits 54-1, 54-2, 54-3 and 54-4. As can be seen from FIG. 2, two pairs of the lines 16 are connected to the phasor determinator circuit 54-1, two pairs to the phasor determinator circuit 54-2, two pairs to the phasor determinator circuit 54-3 and two pairs to the phasor determinator circuit 54-4. Remembering that each bit pair (dibit) corresponds to a phasor component, the two bit pairs applied to each phasor determinator circuit are represented by two phasor components. These two phasor components are selected to correspond to symmetrically positioned subchannels in the OFDM system. That is, if the sixteen subchannels making up the OFDM system are identified as subchannels 0,1,2, . . . ,15 represented by frequencies $f_0, f_1, f_2, \ldots, f_{15}$, then subchannel No. 0 is paired with subchannel No. 15; subchannel No. 1 is paired with subchannel No. 14, etc. In general terms, subchannel No. k is paired with subchannel No. 15–k. The phasor determinator circuits 54 each determine a resultant phasor, which is the resultant of the vector addition of the two phasor components. Since, for QPSK encoding, the phasor of a bit pair has a value $m*\pi/2$, where m=0,1,2 or 3, then the resultant phasor has a phase $X*\pi/4$ where X=0,1,2, . . . 7.

The phasor determinator circuits 54 have output lines 56, referred to individually as output lines 56-1, 56-2, 56-3 and 56-4, connected to respective phasor to two-phases converter circuits 58, referred to individually as phasor converter circuits 58-1, 58-2, 58-3 and 58-4. Also applied to the phasor converter circuits 58 are respective pairs of lines 60-1, 60-2, 60-3 and 60-4 of the eight single lines 18, representing bit pairs for a further four subchannel pairs of the OFDM system. Each phasor converter circuit 58 is arranged to provide outputs on two pairs of lines. Thus the phasor converter circuit 58-1 provides outputs on two line pairs 62-1; the phasor converter circuit 58-2 provides outputs on two line pairs 62-2; and similarly for the phasor converter circuits 58-3 and 58-4, which provide outputs on the two line pairs 62-3 and 62-4, respectively.

It should be understood that each phasor converter circuit 58 is arranged to provide an output representing two phasor axes which, if combined by vector addition, represent a phasor which is orthogonal to the phasor represented on the relevant input line 56-1 to 56-4, that is, orthogonal to the phasor determined by the relevant phasor determinator circuit 54-1 to 54-4. Also, for each phasor converter circuit 58 the two output phasors are again associated with symmetrically located subchannels in the OFDM system, in the manner described hereinabove.

The theoretical explanation for the reduction in crest factor obtained by the described system is briefly as follows. For a single OFDM symbol interval, the result of adding up signals of a symmetrically positioned pair of subchannels having centre of symmetry w can be represented by the product of a fixed phasor and a (complex-valued) carrier frequency factor:

$$e^{ja}.e^{j\omega t}.e^{-j\Delta\omega t}+e^{jb}.e^{j\omega t}.e^{+j\Delta\omega t}=(e^{ja}+e^{jb})0.2\cos(\Delta\omega t).e^{j\omega t},$$

where $(e^{ja}+e^{jb})$ is the phasor. Another pair of symmetrically positioned subchannels with the same centre of symmetry w but a different distance from the centre ($\Delta\omega_2 \neq \Delta\omega$) having a phasor orthogonal to the first phasor, results in a limitation in amplitude of the signal composed of the two symmetrically positioned pairs during an entire symbol interval. In this manner, it is seen that a crest factor reduction for an OFDM channel composed of a plurality of subchannels is achieved.

In summary, it will be appreciated that of the 16 subchannels in the OFDM system, four symmetrically positioned pairs of subchannels (those corresponding to the inputs to the phasor determinator circuits 54) can be freely chosen, and are conveniently referred to as unconditioned pairs. The remaining four symmetrically positioned pairs of subchannels corresponding to the signals on the outputs of the phase converter circuits 58, are partially dependent on the output of the phasor determinator circuits 54, that is to say, partially dependent on the phasor pairs applied from the phasor determinator circuits 54, and partially dependent on the data bits applied over the lines 60-1 to 60-4, respectively. Thus these remaining four symmetrically positioned pairs of subchannels are conveniently referred to as conditioned pairs.

Thus, it will be appreciated that, for the four unconditional pairs, eight bit pairs, that is, 16 bits of information are represented, whereas for the four conditioned pairs only four bit pairs, that is, eight bits of information are represented, because of the phasor orthogonality condition. In total, it is seen that 24 bits of information are represented in the system.

It will be appreciated that circuitry included in the bit mapper 20, that is, the phasor determinator circuits 54 and the phasor converter circuits 58 can readily be implemented by processor logic circuits, or, preferably, by means of look-up tables (LUTs) which are accessed in sequence for the different channel pairs.

Figure 3:
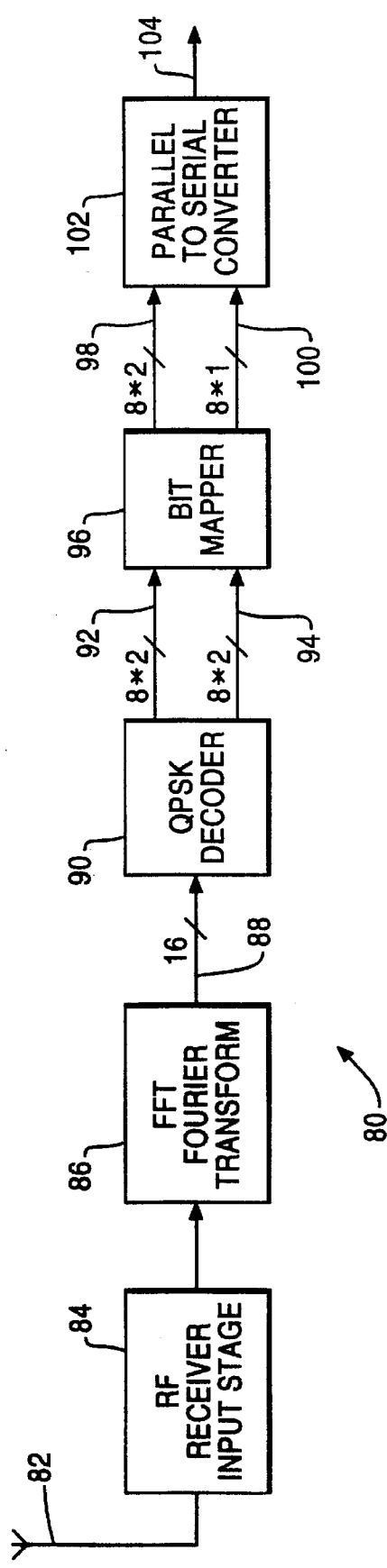
FIG. 3 is a block diagram of a receiver unit according to the first embodiment of the invention.

Referring now to FIG. 3, there is shown a simplified block diagram of a receiver unit 80 for receiving and decoding data transmitted by the transmitter shown in FIG. 1. The receiver unit 80 includes an antenna 82 which receives the incoming RF signals and passes them to an RF receiver input stage 84, the output of which is coupled to a Fourier transform circuit 86 which consists of 16 individual FFT circuits (not shown), and provides outputs on 16 lines 88 connected to a QPSK decoder 90. The RF receiver input stage 84 includes conventional means for preamplification, gain control, filtering and down-conversion from RF to baseband.

The QPSK decoder 90 provides, in known manner, outputs on eight paired lines 92 and eight paired lines 94 representing the respective sixteen bit pairs transmitted over the OFDM system. The lines 92 and 94 are coupled to a bit mapper circuit 96 (to be described) which provides outputs on eight paired lines 98 and eight single lines 100, all 24 lines 98, 100 being coupled to a parallel-to-serial converter 102 which provides a serial-by-bit output signal on a line 104, representing the 24 bits transmitted over the 16 OFDM subchannels of the system.

Referring next to FIG. 4, there is shown a block diagram of the bit mapper 96 shown in FIG. 3. It should be understood that the eight pairs of output lines 92 correspond to the four unconditioned pairs of subchannels discussed hereinabove in relation to the transmitter 10 of FIG. 1, and the eight pairs of output lines 94 correspond to the four conditioned pairs of subchannels. The lines 92 are connected to a node 110 which is directly connected to the eight pairs of output lines 98. The node 110 also connects the eight pairs of lines 92, as two pairs of lines to respective phasor determinator circuits 112, referred to individually as phasor determinator circuits 112-1, 112-2, 112-3 and 112-4, which provide signals representing the determined phasors on output lines 114-1, 114-2, 114-3 and 114-4 respectively.

The remaining eight pairs of output lines 94 of the QPSK decoder 90, representing the conditioned pairs of channels, are connected to a node 116 which connects to respective input line pairs of four further phasor determinator circuits 118, referred to individually as phasor determinator circuits 118-1, 118-2, 118-3 and 118-4, which provide signals representing the determined phasors on output lines 120-1, 120-2, 120-3 and 120-4, respectively. These output lines, together with the output lines 114-1 to 114-4 of the phasor determinator circuits 112, are applied to phase check and bit reducer circuits 122, referred to individually as circuits 122-1, 122-2, 122-3 and 122-4, respectively. These circuits 122 also receive the signals corresponding to the four pairs of conditioned channels from the node 116. The phasor check and bit reducer circuits 122 utilize the phasor information from the phasor determinators 112 and 118 both to verify the orthogonality of the respective phasor pairs, introduced at the transmitter 10, and also to determine the significant eight bits of information encoded on the four conditioned subchannel pairs. These eight bits of information, two for each of the circuits 122, are provided on the eight output lines 100. In summary, there has been described, with reference to FIGS. 1 to 4, a 16-subchannel OFDM/QPSK data transmission system wherein it is found that a crest factor reduction of about 3 dB can be achieved, at the expense of a reduction in the bit rate from 32 Mbps to 24 Mbps. This is effected by arranging the 16 OFDM subchannels as eight symmetrically positioned pairs (corresponding to frequencies $f_0$, $f_{15}$; $f_1$, $f_{14}$; $f_2$, $f_{13}$ etc.), wherein four pairs of subchannels (unconditioned subchannels) can encode 16 bits (two bits per subchannel) and the data for the remaining four pairs of subchannels (conditioned subchannels) is partially dependent on the data on the four unconditioned subchannel pairs, to provide the above-described phase orthogonality relationship, thereby reducing the crest factor. With this restriction, the number of data bits which can be coded onto the four conditioned subchannel pairs is restricted to only eight bits (one bit per subchannel).

Figure 5:
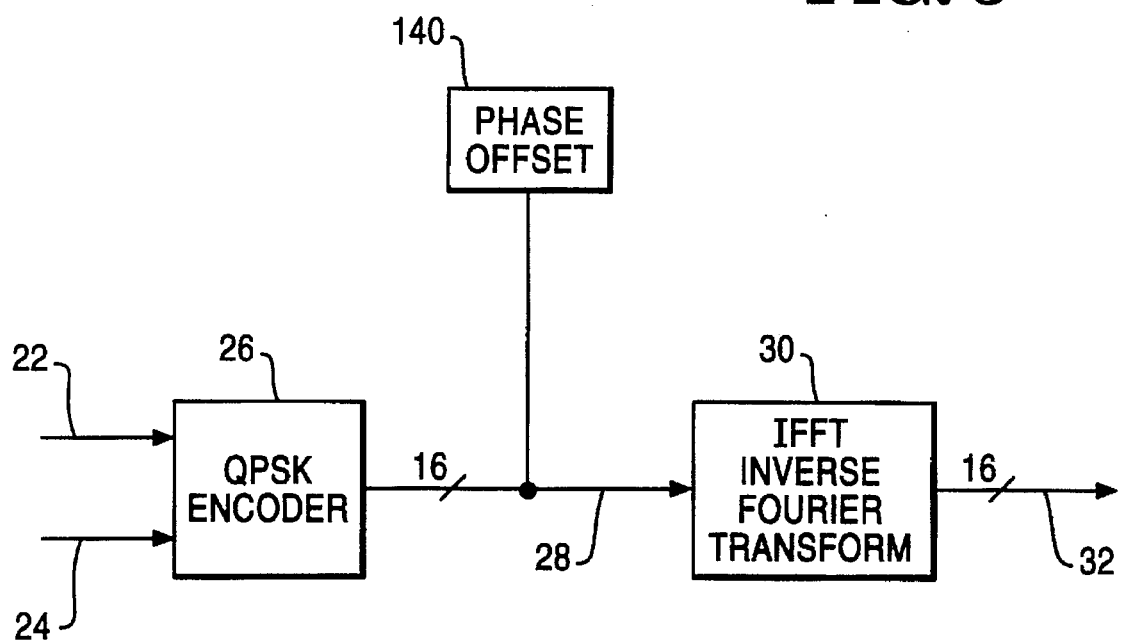
FIG. 5 is a diagram of a portion of the transmitter unit shown in FIG. 1, in accordance with a modification of the first embodiment of the invention.
Figure 6:
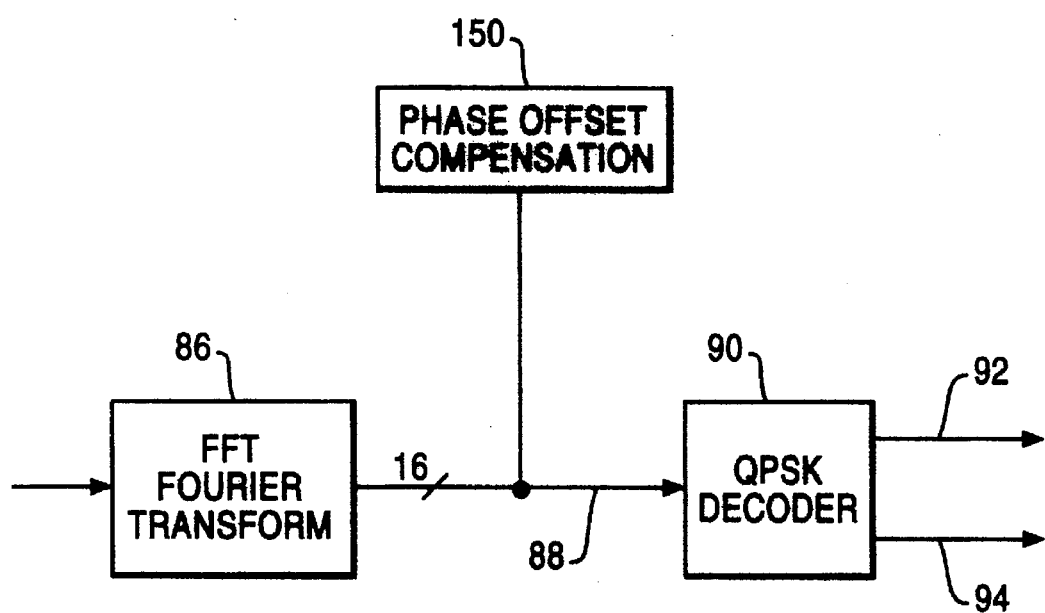
FIG. 6 is a diagram of a portion of the receiver unit shown in FIG. 3, in accordance with the modification of the first embodiment of the invention.

A modification of the above-described system will now be described, with reference to FIGS. 5 and 6. With this modification an additional crest factor reduction can be achieved. In this modification, the transmission system is essentially the same as the transmission system shown in FIG. 1, except that a phase offset device 140, FIG. 5, is provided, which effects a 90° phase shift of the middlemost (central) pair of OFDM subchannels (corresponding to frequencies $f_7$ and $f_8$), with respect to the next middlemost pair of OFDM subchannels (corresponding to frequencies $f_6$ and $f_9$). It is found that with this 90° phase compensation a further crest factor reduction, of about 0.25 dB, can be achieved. With reference to FIG. 6, the receiver for the modified embodiment is essentially the same as the receiver shown in FIG. 3, except that a phase offset compensation device 150 is connected to compensate for the 90° phase offset of the middlemost pair of subchannels, with respect to the next middlemost pair of subchannels.

A second embodiment of the invention will now be described with reference to FIGS. 7 to 11. The second embodiment employs generally the same system elements as the first embodiment. Thus, referring to FIG. 7 the transmitter unit 210 of the second embodiment is seen to resemble the transmitter unit 10 of the first embodiment, illustrated in FIG. 1, corresponding elements having the same references, with an initial digit 2 inserted in FIG. 7. The second embodiment enables the bit rate to be increased, from 24 Mbps to 26 Mbps without affecting the crest factor reduction achieved in the first embodiment. The important difference between the transmitter 210 (FIG. 7) and the transmitter 10 (FIG. 1) is that the bit mapper 220 is of different construction from the bit mapper 20. The remaining elements shown in FIG. 7 are essentially the same as the corresponding elements of FIG. 1.

It will be appreciated that, within the four unconditioned pairs of subchannels, the phasor axes may be represented as A, B, C or D, having the respective values $n*\pi/4$ (where $n=0,1,2,3$). Within the conditioned pair of subchannels, phase compensation is effected by making the number $n_C$ of phasor axes C equal to the number $n_A$ for A, and the number $n_D$ for D equal to the number $n_B$ for B.

Thus for the unconditioned and conditioned pairs together, the requirement is that $n_A=n_C$ and $n_B=n_D$. This offers an opportunity to encode additional data bits. For example, if the four unconditioned pairs correspond to ABAC, then the four conditioned pairs should correspond to a pattern with at least one C and one D and the remaining two phasors could correspond to A and C or B and D, and using this redundancy any permutation of these is permissible.

If it is assumed that the four unconditioned pairs do not have identical phasor axes (i.e. they are not all A's, B's, C's or D's), then there exist, for the four conditioned pairs, at least four acceptable permutations (and in general, significantly more than four). This means that the limitation for the four conditioned pairs can be changed, such that a bit rate corresponding to 8*2+8*1+2 that is, 26, or two additional bits can be achieved, as compared with the first embodiment. If the four conditioned pairs do correspond to equal phasor axes (i.e. they are four A's, four B's, four C's or four D's) then a mapping is effected to enable four permutations by mapping say four A's into ABCD and transmitting ABCD instead of AAAA on the four unconditioned pairs of subchannels. On the four conditioned pairs of subchannels, a selected one of the four permutations shown in the right hand column of FIG. 8 (ABCD) is transmitted, in accordance with the two additional bits being encoded. Also, if a "genuine" ABCD, for example, is to be transmitted over the unconditioned subchannels, then different permutations (DCBA etc.) are chosen in accordance with the additional two bits being encoded, as shown in the fifth row of FIG. 8.

Figure 9:
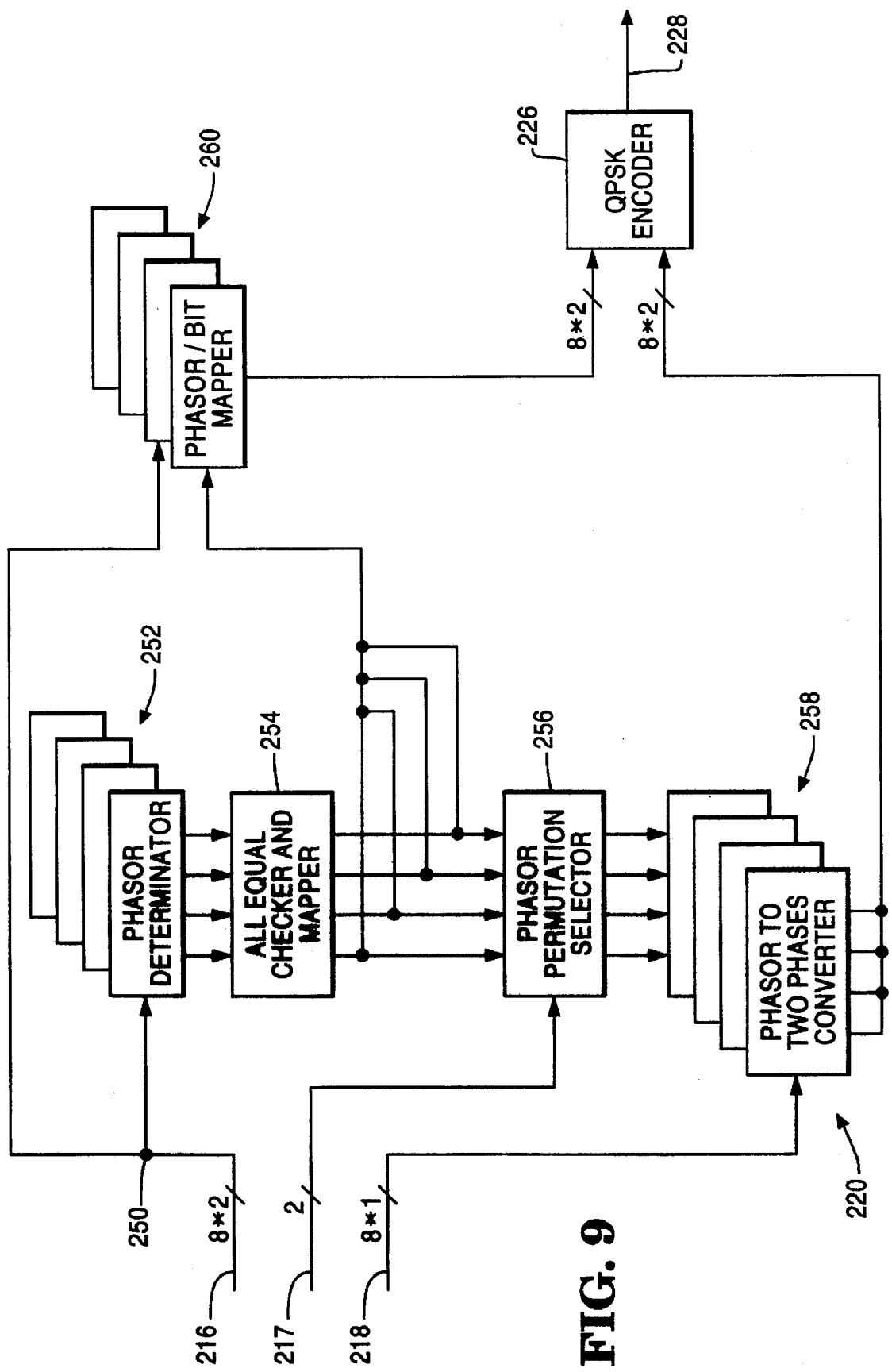
FIG. 9 is a block diagram of a bit mapper utilized in the transmitter unit shown in FIG. 7.

Referring now to FIG. 9, there is shown a diagram of the bit mapper 220 (FIG. 7), embodying the principle illustrated by the Table of FIG. 8. As an aid to clarity, the diagram of the bit mapper 220 has been simplified as compared with the bit mapper 20 shown in FIG. 2, by omitting some of the individual connections. It will, of course, be appreciated, that in the second embodiment, the serial-to-parallel converter 214 operates on 26 bits instead of 24 bits and has output lines 216 arranged as eight pairs, output lines 217, representing two (additional) individual lines, and eight output lines 218.

The eight pairs of lines 216 are applied to a node 250 which is connected to a phasor determinator 252 which determines four phasor axes (selected from A, B, C and D, referred to above) for four respective symmetrical unconditioned pairs, as in the first embodiment. The output of the checker and mapper circuit 254 is also applied to a phasor permutation selector 256, which selects an appropriate one of the four permutations shown in the last column of FIG. 8, in accordance with the bit pair applied over the line pair 217. It will be appreciated that if a "genuine" ABCD combination, for example is present on the four unconditioned pairs, then different permutations are selected (compare for example, the first and fifth rows of FIG. 8). The output of the phasor permutation selector 256 is applied to a phasor to two phases converter 258, which operates in a similar manner to the converter 58 shown in FIG. 2, to provide the output phasors for the four conditioned subchannel pairs to the QPSK encoder 226. The node 250 is also connected to a phasor/bit mapper circuit 260 which either transmits the phasor bits directly to the QPSK encoder 226, or if the phasors correspond to an entry in the first column of FIG. 8, effects a mapping to the corresponding entry in the second column of FIG. 8, prior to transmission to the QPSK encoder 226.

Referring now to FIG. 10 there is shown a block diagram of the receiver unit 280 for the second embodiment. Again, the various elements thereof corresponding to elements shown in FIG. 3 are identified by the same references, with an initial 2 (or 3) digit. The elements shown in FIG. 10 are essentially the same as corresponding elements in FIG. 3, except that the construction of the bit mapper 296 differs from that of the bit mapper 96.

Figure 11:
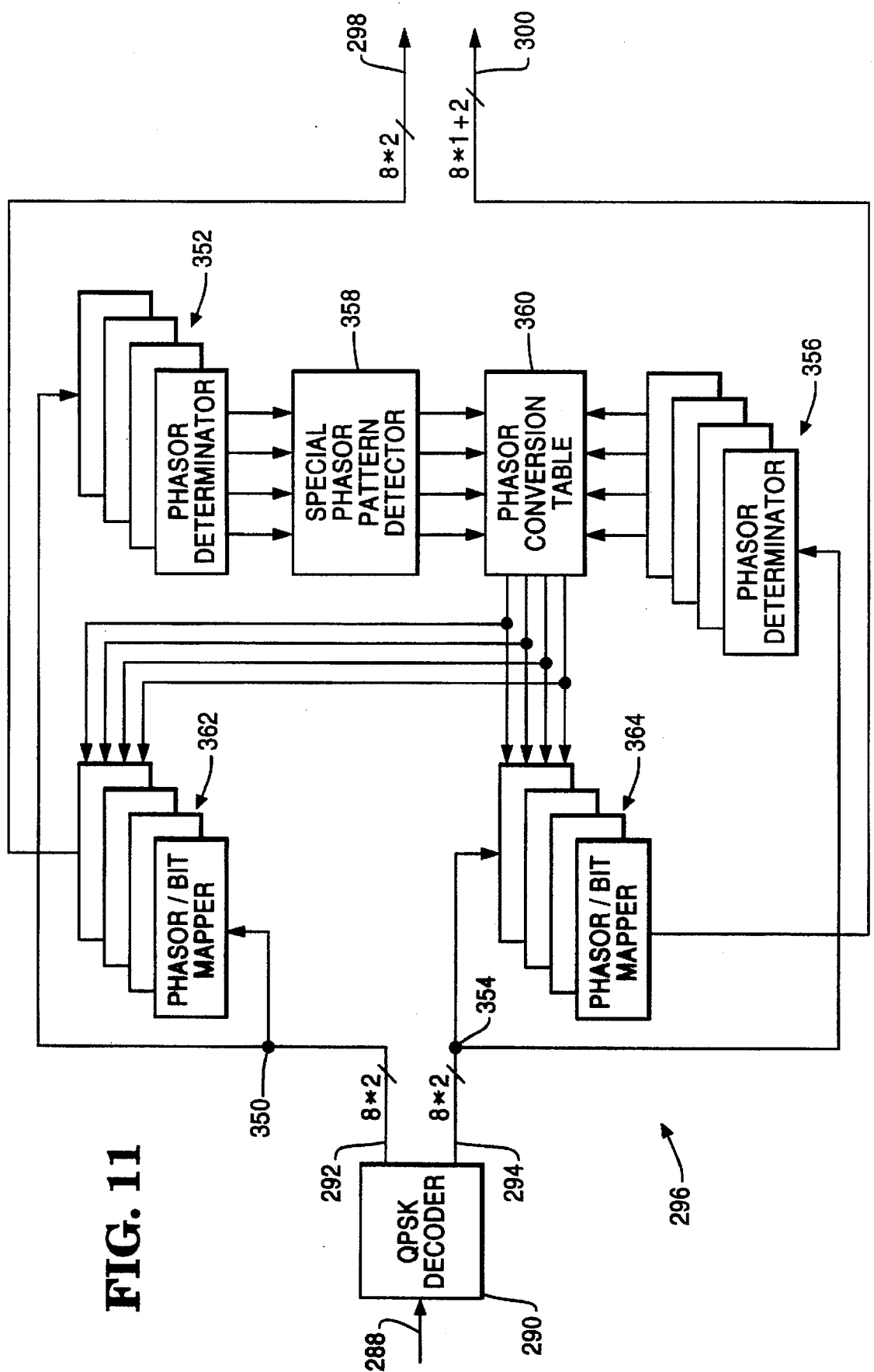
FIG. 11 is a block diagram of a bit mapper utilized in the receiver unit shown in FIG. 10.

Referring to FIG. 11, there is shown a block diagram of the bit mapper 296. The lines 292 are connected to a node 350 which is coupled to a phasor determinator 352. These lines correspond to the four unconditioned subchannels in the OFDM system. The phasor determinator 352 determines the corresponding phasor information, represented as phasors A, B, C, or D. The lines 294 are connected to a node 354 which is coupled to a phasor determinator circuit 356 which determines four phasor axes for the four respective symmetrically positioned conditioned subchannel pairs. The outputs of the phasor determinator 352 are applied to a special phasor pattern detector 358, which checks for the presence of the particular patterns in the second column of FIG. 8. The pattern detector 358 and phasor determinator 356 are connected to a phasor conversion table circuit 360, which implements appropriate phasor conversions (mappings) in accordance with the Table of FIG. 8 when the special patterns are detected.

The node 350 is connected to a phasor/bit mapper circuit 362 which is coupled to the output lines 298 and the node 354 is connected to a phasor/bit mapper circuit 364 which is coupled to the output lines 300. If the special patterns are detected then appropriate phasor conversion is made in the phasor/bit mapper circuits 362 and 364 in accordance with Table of FIG. 8, such that the correct output signals are applied to the lines 298 and 300. If the special patterns are not detected in the detector circuit 358, then the phasor/bit mapper circuit 362 (for the unconditioned subchannels) passes the output of the QPSK decoder 290 on the lines 292 directly to the output lines 298, whereas the phasor/bit mapper circuit 364 (for the conditioned subchannels) passes eight bits (as is the first embodiment) plus two bits in dependence on the particular permutation detected (last column of FIG. 8).

As for the first embodiment, the bit mappers of FIGS. 9 and 11 for the second embodiment can be implemented by digital signal processing circuitry. An alternative implementation is in the form of LUTs (look-up tables) which may be accessed in sequence for the respective channel pairs.

It will be appreciated that the bit mapping procedure utilized in the second embodiment takes advantage of the redundancy inherent in the 16-subchannel OFDM system utilized in the first embodiment wherein only 24 bits are transmitted in a symbol interval as compared with a total of 32 bits which could be transmitted over a 16-subchannel OFDM system using QPSK encoding. This redundancy enables an increase in the bit rate from 24 to 26 bits per symbol interval. By using more complex mapping schemes, it would be possible to further increase the achievable bit rate, while maintaining crest factor reduction.

The bit mapping schemes used in both the first and second embodiments derive phasor information from the bits that correspond to symmetrically positioned pairs of subchannels. This phasor information has to satisfy prescribed patterns in order to achieve the crest factor reduction as described hereinabove. It will be appreciated that this requirement with regard to phasor patterns can be utilized for error detection and correction schemes.

Although the described embodiments utilize a 16-subchannel OFDM system with QPSK encoding, it will be appreciated that it is within the scope of the invention to utilize OFDM systems with a different number of subchannels, e.g. 32-subchannel OFDM, and to utilize different forms of encoding such as BPSK (binary phase shift keying) or 8PSK (eight phase shift keying), for example.

In summary, the present invention enables a reduction in the crest factor (ratio of peak-envelope-voltage to mean (RMS) voltage, in an RF system), at the expense of only a limited bit-rate reduction. Furthermore the implementation is relatively simple. For example, look-up tables of small size can be utilized. The reduced crest factor lowers the design requirements of the power amplifier in the RF transmitter output stage and may assist in complying with regulatory power level requirements.

While the invention has been illustrated and described in detail in the drawings and foregoing description, such illustration and description is to be considered as exemplary and not restrictive in character, it being understood that only the preferred embodiments have been shown and described and that all changes and modifications that come within the spirit of the invention are desired to be protected.

What is claimed is:

1. A method of transmitting information over an OFDM (orthogonal frequency division multiplexing) channel having a plurality of OFDM subchannels, comprising the steps of:

determining a first phasor axis for each pair of a first set of pairs of symmetrically positioned subchannels of said OFDM subchannels, the determination being dependent on the information to be transmitted over that subchannel pair;

determining a second phasor axis for each pair of a second set of pairs of symmetrically positioned subchannels of said OFDM subchannels, the determined second phasor axis being dependent on information to be transmitted and being orthogonal to the first phasor axis of one of said first set of pairs of subchannels; and transmitting signals dependent on the determined first and second phasor axes over said OFDM subchannels.

2. The method according to claim 1, wherein the transmitting step includes the step of transmitting signals in a phase modulated format.

3. The method according to claim 2, wherein the transmitting step includes the step of transmitting signals in QPSK (quadrature phase shift keying) format.

4. The method according to claim 3, wherein the OFDM channel includes sixteen OFDM subchannels, and further comprising the step of:

transmitting two bits of information over each subchannel of said first set of pairs of subchannels and transmitting one bit of information over each subchannel of said second set of pairs of subchannels.

5. The method according to claim 4, further comprising the step of:

utilizing predetermined phasor axis permutations on said second set of pairs of subchannels to represent additional information bits.

6. An apparatus for transmitting information over an OFDM (orthogonal frequency division multiplexing) channel having a plurality of OFDM subchannels, comprising:

bit mapping means for (1) determining a first phasor axis for each of a first set of symmetrically positioned subchannels of said OFDM subchannels in dependence on the information to be transmitted over that subchannel pair, and (2) determining a second phasor axis for each pair of a second set of pairs of symmetrically positioned subchannels of said OFDM subchannels in dependence on information to be transmitted, and such as to be orthogonal to the first phasor axis of one of said first pairs of subchannels; and transmitting means for transmitting signals having the determined first and second phasor axes over said OFDM subchannels.

7. The apparatus according to claim 6, wherein said transmitting means includes a phase shift encoder.

8. The apparatus according to claim 7, wherein said phase shift encoder includes a QPSK (quadrature phase shift keying) encoder.

9. The apparatus according to claim 8, wherein said transmitting means includes a Fourier transform converter coupled to an output of said QPSK encoder.

10. The apparatus according to claim 9, wherein said transmitting means includes an RF transmitter coupled to an output of said Fourier transform converter.

11. The apparatus according to claim 6, further comprising:

means for (1) receiving the information transmitted by said transmitting means over the OFDM subchannels, and (2) converting the information into the form in which it was applied to said bit mapping means.

\* \* \* \* \*